(12) United States Patent
Yoshimura

(10) Patent No.: US 7,839,050 B2
(45) Date of Patent: Nov. 23, 2010

(54) DRIVE APPARATUS FOR ULTRASONIC MOTOR

(75) Inventor: Katsuhiko Yoshimura, Hachioji (JP)

(73) Assignee: Olympus Corporation, Tokyo (JP)

( * ) Notice: Subject to any disclaimer, the term of this patent is extended or adjusted under 35 U.S.C. 154(b) by 244 days.

(21) Appl. No.: 12/236,960

(22) Filed: Sep. 24, 2008

(65) Prior Publication Data
US 2009/0085433 A1    Apr. 2, 2009

(30) Foreign Application Priority Data
Sep. 28, 2007   (JP) ............................. 2007-256151

(51) Int. Cl.
*H01L 41/08* (2006.01)
(52) U.S. Cl. ........................... 310/316.01; 310/316.02; 310/323.02
(58) Field of Classification Search ............ 310/316.01, 310/316.02, 317, 323.02; 318/116–118
See application file for complete search history.

(56) References Cited

U.S. PATENT DOCUMENTS 5,099,180 A  *  3/1992  Noguchi ..................... 318/116
5,157,300 A  *  10/1992  Kataoka et al. ........ 310/323.04
5,191,688 A  *  3/1993  Takizawa et al. ........... 29/25.35
6,020,673 A  *  2/2000  Matsumoto ............ 310/316.02

FOREIGN PATENT DOCUMENTS

JP    2002-369557    12/2002

* cited by examiner

*Primary Examiner*—Mark Budd
(74) *Attorney, Agent, or Firm*—Scully, Scott, Murphy & Presser, P.C.

(57) ABSTRACT

A drive apparatus for an ultrasonic motor is provided wherein a diphase alternating drive signal having a predetermined phase difference and a predetermined drive frequency is applied to an ultrasonic vibrator equipped with a driver to be in contact with a driven member, such that longitudinal vibration and bending vibration are simultaneously generated in the ultrasonic vibrator to generate elliptical vibration, and drive force is obtained from the elliptical vibration to drive the driven member by the ultrasonic vibrator. The drive apparatus for the ultrasonic motor includes drive unit for generating the alternating drive signal and applying the alternating drive signal to the vibrator to drive the driven member, and burst drive unit for performing burst drive by applying, to the vibrator, a burst signal to inhibit residual vibration in the driven member after the driving of the driven member by the drive unit has been stopped.

6 Claims, 9 Drawing Sheets

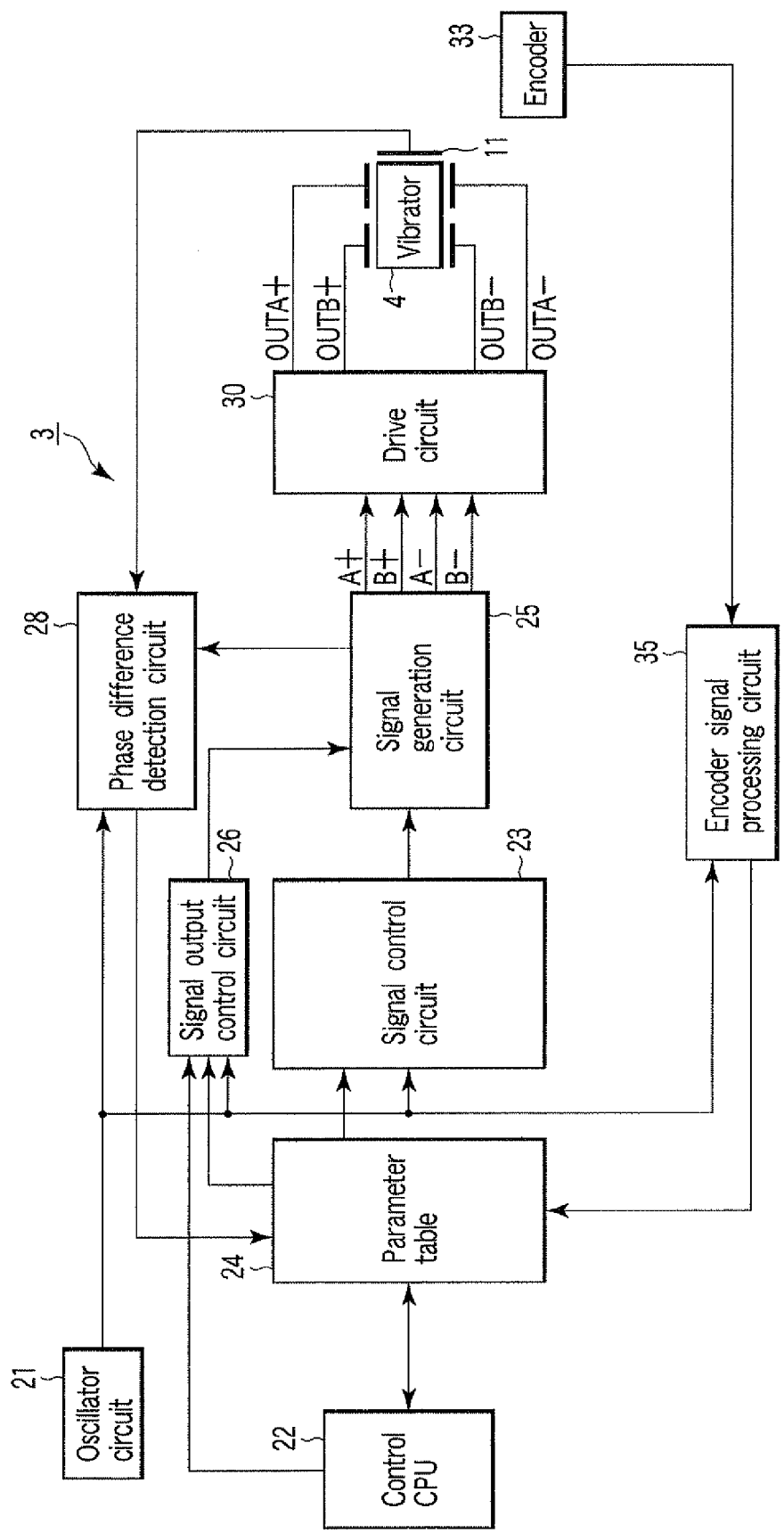
F I G. 7

| Input to drive circuit 30 | | Output of drive circuit 30 | |
|---|---|---|---|
| A+ or B+ | A- or B- | OUTA+/OUTB+ | OUTA-/OUTB- |
| L | L | — | — |
| L | H | L | H |
| H | L | H | L |
| H | H | L | L |

Continuous drive

Burst drive

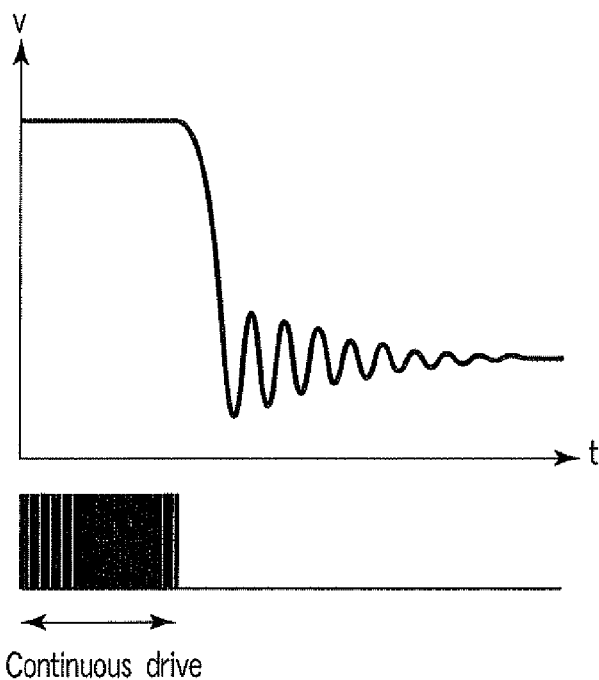
F I G. 16
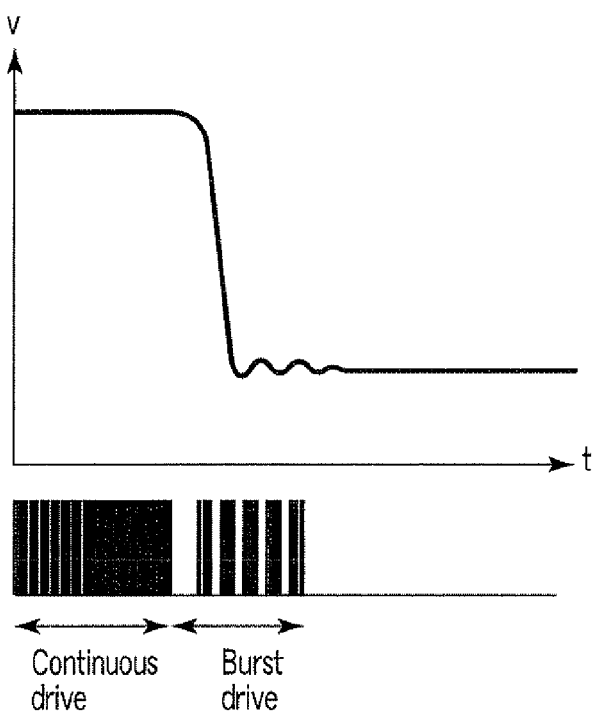
F I G. 17

DRIVE APPARATUS FOR ULTRASONIC MOTOR

CROSS-REFERENCE TO RELATED APPLICATIONS

This application is based upon and claims the benefit of priority from prior Japanese Patent Application No. 2007-256151, filed Sep. 28, 2007, the entire contents of which are incorporated herein by reference.

BACKGROUND OF THE INVENTION

1. Field of the Invention

The present invention relates to a drive apparatus for an ultrasonic motor.

2. Description of the Related Art

Recently, attention has been paid to an ultrasonic motor using the vibration of a vibrator such as a piezoelectric element, as a new motor replacing an electromagnetic motor. As compared with the conventional electromagnetic motor, the ultrasonic motor is advantageous, for example, in that it provides a low-velocity high thrust without any gear, in that it provides great holding force, in that it provides a long stroke, in that it provides a high resolution, in that it provides good silence, and in that it does not generate magnetic noise and is not affected by magnetic noise.

Furthermore, in the ultrasonic motor, an ultrasonic vibrator is pressed, via a driver which is a frictional member, against a driven member which is a relatively moving member, such that frictional force is generated between the driver and the driven member, and the driven member is driven by this frictional force.

On the other hand, in actually driving the ultrasonic motor, control techniques are required to appropriately damp the vibration in the ultrasonic motor at the time of stopping or reversing the ultrasonic motor. Under such circumstances, the following technique has been disclosed in, for example, Jpn. Pat. Appln. KOKAI Publication No. 2002-369557:

In a control unit of a vibrating actuator disclosed in Jpn. Pat. Appln. KOKAI Publication No. 2002-369557, when an alternating drive signal is applied to a piezoelectric element of the vibrating actuator to drive the vibrating actuator and the vibrating actuator is then stopped at a target position, a phase difference is detected between the applied voltage and the vibration of the vibrator of the vibrating actuator, and a vibration excitation signal is applied to the piezoelectric element for a predetermined time with a phase which is delayed, for example, about 90° with respect to the phase of the vibration of the vibrator, thereby finishing the stopping operation.

Thus, according to the control unit of the vibrating actuator disclosed in Jpn. Pat. Appln. KOKAI Publication No. 2002-369557, vibration which counteracts free vibration in the vibrator is excited, and damping vibration is inhibited, thereby positioning the actuator at the target position.

However, the control unit of the vibrating actuator disclosed in Jpn. Pat. Appln. KOKAI Publication No. 2002-369557 is characterized in that the phase difference between the drive signal and the vibration formed in the vibrator is changed (0 to 180 degrees) to counteract the vibration of the vibrator itself and decelerate or stop the actuator. Moreover, in order to achieve such control, a drive circuit is complicated due to the need for means for detecting the vibration of the vibrator, means for comparing the phases of the detected vibration and the drive signal, and means for delaying the phase of the drive signal on the basis of the comparison. This can be said to be a technically obstructive factor in reducing the size of the control unit.

Furthermore, in the control unit of the vibrating actuator disclosed in Jpn. Pat. Appln. KOKAI Publication No. 2002-369557, the vibration which counteracts the free vibration in the vibrator is excited. That is, the vibrator is targeted for the inhibition of the vibration. Therefore, it is hard to say that the response and accuracy are higher than in the technique that inhibits the vibration of the vibrating system.

BRIEF SUMMARY OF THE INVENTION

The present invention has been made in view of the foregoing circumstances, and is directed to provide a drive apparatus for an ultrasonic motor which achieves higher stop position accuracy and satisfactory response in controlling the stopping of an ultrasonic motor as well as circuit simplification.

In order to achieve the above object, there is provided a drive apparatus for an ultrasonic motor according to a first aspect of the present invention in which a diphase alternating drive signal having a predetermined phase difference and a predetermined drive frequency is applied to a vibrator equipped with a driver to be in contact with a driven member, such that longitudinal vibration and bending vibration are simultaneously generated in the vibrator to generate elliptical vibration, and drive force is obtained from the elliptical vibration to drive the driven member by the driver, the drive apparatus for the ultrasonic motor comprising: drive unit for generating the alternating drive signal and applying the alternating drive signal to the vibrator to drive the driven member; and burst drive unit for performing burst drive by applying, to the vibrator, a burst signal to inhibit residual vibration in the driven member after the driving of the driven member by the drive unit has been stopped.

According to the present invention, it is possible to provide a drive apparatus for an ultrasonic motor which achieves higher stop position accuracy and satisfactory response in controlling the stopping of an ultrasonic motor as well as circuit simplification.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 7 is a diagram showing the internal schematic configuration of a drive apparatus;

FIG. 16 is a diagram showing a change in the driving velocity of the ultrasonic motor in the case where the burst drive by the burst signal is not performed; and FIG. 17 is a diagram showing one example of stop control by a drive apparatus for an ultrasonic motor according to a second embodiment.

DETAILED DESCRIPTION OF THE INVENTION

A drive apparatus for an ultrasonic motor according to embodiments of the present invention will hereinafter be described with reference to the drawings.

FIRST EMBODIMENT

Figure 1:
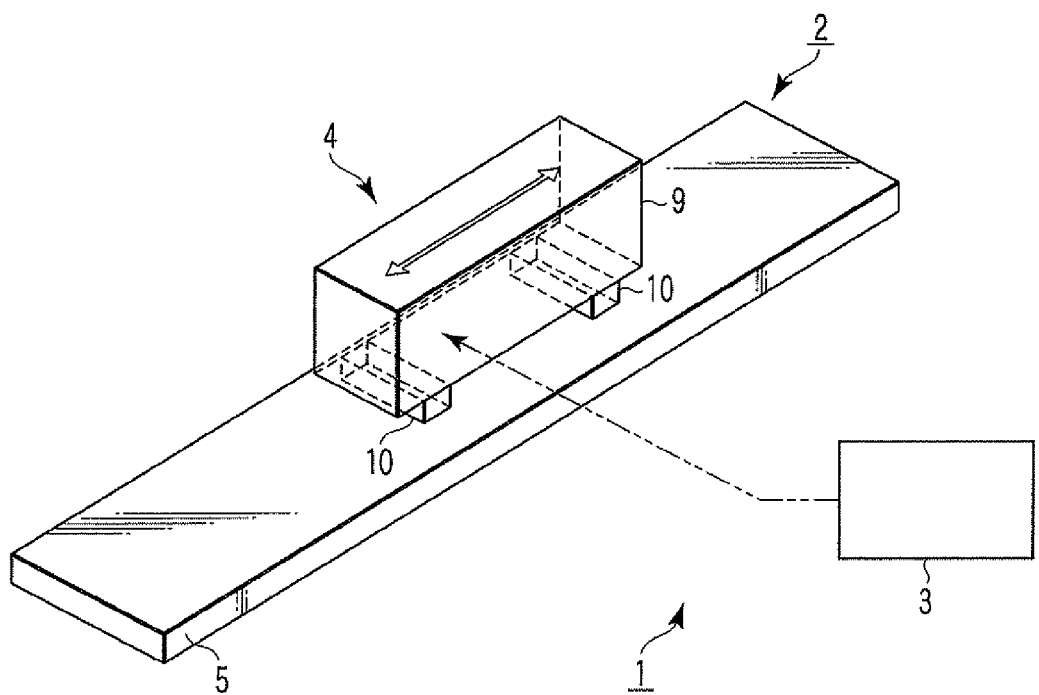
FIG. 1 is a block diagram showing one schematic configuration example of an ultrasonic motor system according to a first embodiment of the present invention.

Initially, one example of an ultrasonic motor system to which a drive apparatus for an ultrasonic motor according to a first embodiment of the present invention is applied is described with reference to FIG. 1. FIG. 1 is a block diagram showing one schematic configuration example of an ultrasonic motor system.

As shown in FIG. 1, an ultrasonic motor system 1 comprises an ultrasonic motor 2, and a drive apparatus 3 for driving the ultrasonic motor 2. The ultrasonic motor 2 has an ultrasonic vibrator 4, and a driven member 5 driven by the ultrasonic vibrator 4.

Figure 2:
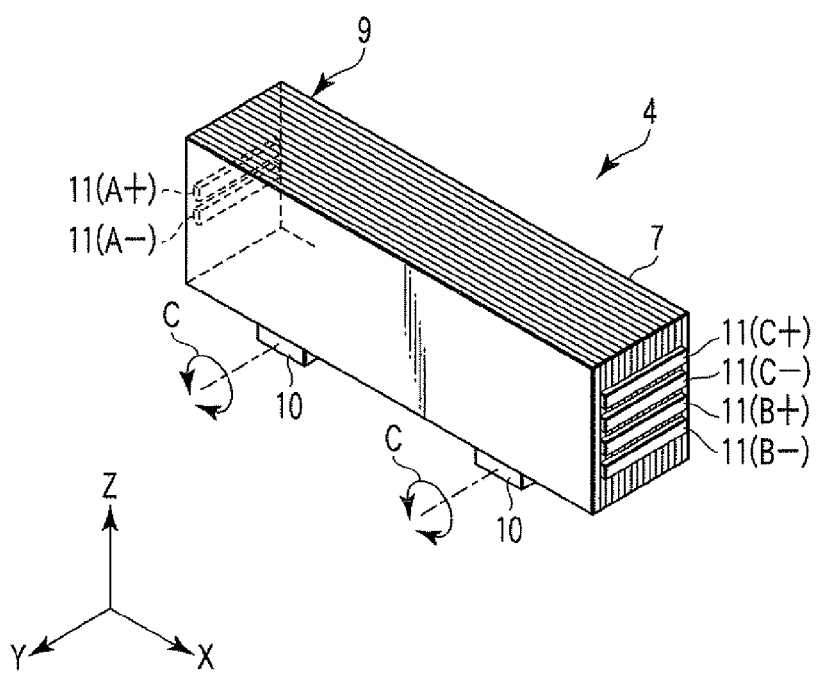
FIG. 2 is a diagram showing one configuration example of an ultrasonic vibrator.
Figure 3:
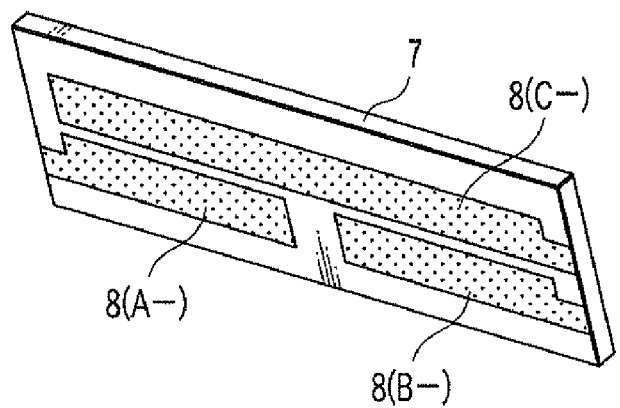
FIG. 3 is a diagram showing one configuration example of a piezoelectric ceramic sheet with internal electrodes.
Figure 4:
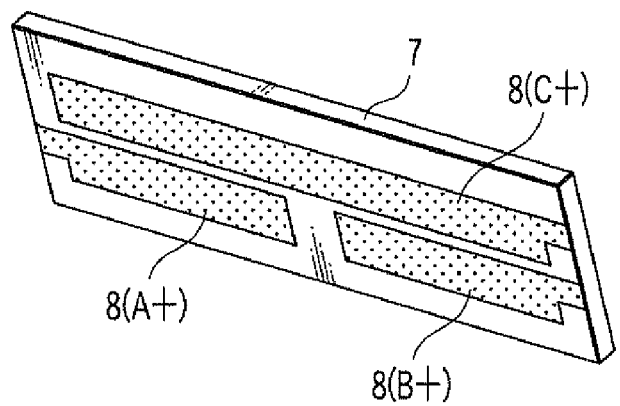
FIG. 4 is a diagram showing one configuration example of a piezoelectric ceramic sheet with internal electrodes.

As shown in FIGS. 2 to 4, the ultrasonic vibrator 4 includes a rectangular parallelepiped piezoelectric stack 9 composed of a plurality of stacked sheet-shaped internal electrodes 8 provided on one side of rectangular plate-shaped piezoelectric ceramic sheets 7, and two frictional contacts 10 adhesively bonded to one surface of the piezoelectric stack 9.

As shown in FIGS. 3 and 4, each of the piezoelectric ceramic sheets 7 includes the internal electrode 8 on its entire surface. The internal electrode 8 is composed of one detection internal electrode provided along the longitudinal direction of the piezoelectric ceramic sheet 7 in the center of the piezoelectric ceramic sheet 7, and two drive internal electrodes disposed around the detection internal electrode and provided at an insulating distance from the detection internal electrode in the width direction of the piezoelectric ceramic sheet 7. Here, the two drive internal electrodes are provided at the insulating distance from the detection internal electrode in the longitudinal direction of the piezoelectric ceramic sheet 7, and equal to each other in size. Each internal electrode 8 is disposed at a distance from the peripheral edge of the piezoelectric ceramic sheet 7, and partly extends to the peripheral edge of the piezoelectric ceramic sheet 7.

The piezoelectric ceramic sheets 7 including the internal electrodes 8 as shown in FIG. 3 and the internal electrodes 8 as shown in FIG. 4 are alternately stacked, thereby constituting the rectangular parallelepiped piezoelectric stack 9.

A total of six external electrodes 11 are provided including four on one side in the longitudinal direction of the piezoelectric stack 9 and two on the other side in the longitudinal direction of the piezoelectric stack 9. All the internal electrodes 8 arranged at the same position of the piezoelectric ceramic sheets 7 of the same kind are connected to each of the external electrodes 11. Thus, the internal electrodes 8 arranged at the same position of the piezoelectric ceramic sheets 7 of the same kind all have the same potential.

In addition, these external electrodes 11 are connected to a controller (not shown) via wiring lines (not shown), respectively. The wiring lines may be any wiring lines as long as they are flexible, such as lead wires or flexible substrates.

Next, the operation of the piezoelectric stack 9 is described. The four external electrodes 11 formed on one side in the longitudinal direction of the piezoelectric stack 9 are defined as a C-phase (C+, C−) and a B-phase (Bd+, B−) in order from the upper side (upper side in FIG. 2) of the piezoelectric stack 9, while the two external electrodes 11 formed on the other side are defined as an A-phase (A+, A−) from the upper side (upper side in FIG. 2) of the piezoelectric stack 9. Here, the A-phase and the B-phase correspond to drive external electrodes, and the C-phase corresponds to vibration detection external electrodes.

Figure 5:
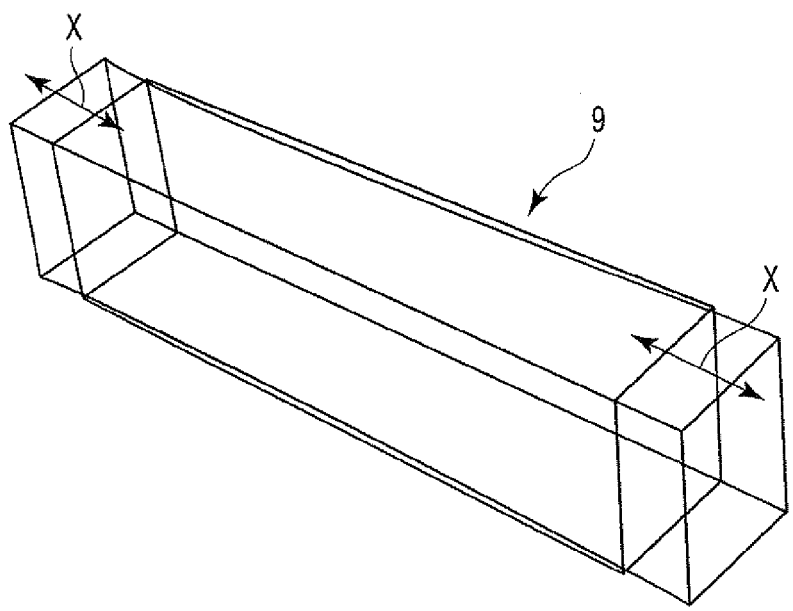
FIG. 5 is a diagram showing the longitudinal vibration of a piezoelectric stack.
Figure 6:
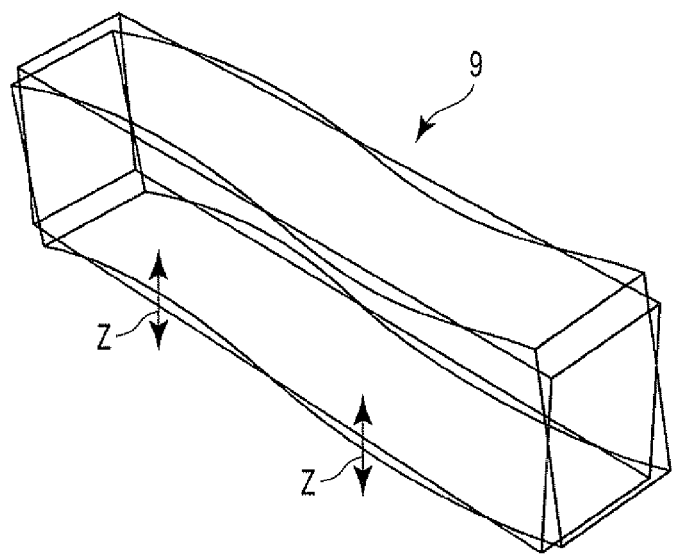
FIG. 6 is a diagram showing the bending vibration of the piezoelectric stack.

When alternating voltages being in phase and having a resonant frequency or a frequency corresponding to its neighboring frequency are applied to the A-phase and the B-phase, primary longitudinal vibration as shown in FIG. 5 is excited in the piezoelectric stack 9. Moreover, when alternating voltages being of opposite phase and having a frequency corresponding to the resonant frequency are applied to the A-phase and the B-phase, secondary bending vibration as shown in FIG. 6 is excited in the piezoelectric stack 9. FIGS. 5 and 6 are diagrams showing results of computer analyses based on a finite element method.

When the primary longitudinal vibration is generated in the piezoelectric stack 9, the frictional contacts 10 are displaced in the longitudinal direction of the piezoelectric stack 9 (the X direction shown in FIG. 6). On the other hand, when the secondary bending vibration is generated in the piezoelectric stack 9, the frictional contacts 10 are displaced in the width direction of the piezoelectric stack 9 (the Z direction shown in FIG. 6).

Therefore, alternating drive voltages out of phase by 90° and having the resonant frequency or the frequency corresponding to its neighboring frequency are applied to the A-phase and the B-phase of the ultrasonic vibrator, such that the primary longitudinal vibration and the secondary bending vibration are simultaneously generated, and as indicated by arrows C in FIG. 2, clockwise or counterclockwise substantially elliptical vibration is generated in the piezoelectric stack 9 at the positions of the frictional contacts 10.

Furthermore, a charge corresponding to the longitudinal vibration generated in the ultrasonic vibrator is excited by the detection internal electrodes 8, such that a signal proportionate to the longitudinal vibration (this signal is hereinafter referred to as a "vibration detection signal") is detected via the external electrodes 11 of the C-phase (C+, C−). This vibration detection signal is supplied to the drive apparatus 3 (see FIG. 1), and used to control the ultrasonic vibrator 4.

The drive apparatus 3 is described below in detail. FIG. 7 is a diagram showing the internal schematic configuration of the drive apparatus 3. As shown in FIG. 7, the drive apparatus 3 comprises an oscillator circuit (reference signal generation means) 21, a control CPU 22, a signal control circuit 23, a parameter table 24, a signal generation circuit 25, a signal output control circuit 26, a phase difference detection circuit 28, a drive circuit 30, an encoder 33, and an encoder signal processing circuit 35.

Figure 8:
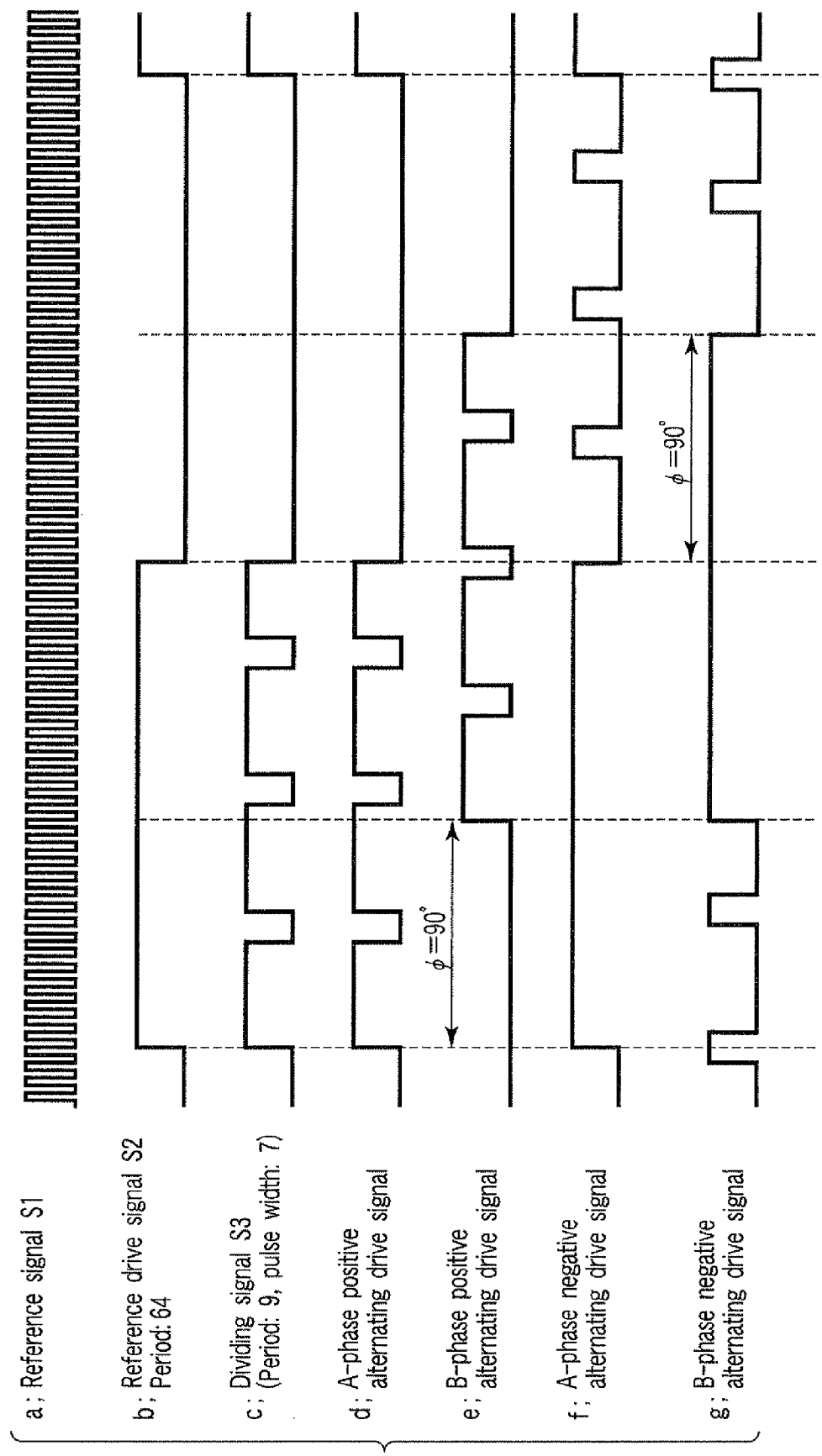
FIG. 8 is a diagram showing one example of a reference signal.

The oscillator circuit 21 generates a reference signal (clock signal), and outputs it to the signal control circuit 23, the signal generation circuit 25, the signal output control circuit 26, and the phase difference detection circuit 28. Details are described later. FIG. 8 is a diagram showing one example of the reference signal.

The parameter table 24 stores various parameters necessary for controlling the ultrasonic motor 2, such as a drive frequency of the ultrasonic vibrator 4, the phase difference between the A-phase and the B-phase (90° in the present first embodiment), the pulse width of a later-described dividing signal, the initial position and stop position of the ultrasonic motor 2, and a later-described error correction value.

The control CPU 22 sets the various parameters (the frequency, the phase difference, etc.) in the parameter table 24 to control the drive signal of the ultrasonic vibrator 4. Further, the control CPU 22 reads the various parameters (the phase difference, an encoder count value, etc.) from the parameter table 24, and performs positional controls velocity control processing, etc. That is, the control CPU 22 creates a frequency command value of the reference drive signal, a pulse width command value of the dividing signal, a phase difference command value of the A-phase and the B-phase, etc. on the basis of the parameter table 24 and a feedback value from the phase difference detection circuit 28 described later. Then, the control CPU 22 outputs the frequency command value of the reference drive signal to the signal control circuit 23, and outputs the phase difference command value of the A-phase and the B-phase to the signal generation circuit 25.

Here, the frequency command value of the reference drive signal is a command value whereby the frequency of the reference drive signal coincides with the resonant frequency of the ultrasonic vibrator 4. The pulse width command value of the dividing signal is a value determined in accordance with the velocity of the ultrasonic motor. For example, when the ultrasonic motor is controlled at a preset and predetermined constant velocity, the control CPU 22 reads a pulse width set in accordance with the predetermined velocity from the parameter table, and uses this pulse width as the pulse width command value. The pulse width is set to a higher value at a higher velocity. The phase difference command value of the A-phase and the B-phase is a command value whereby the phase difference between the A-phase and the B-phase coincides with a preset optimum phase difference (90° in the present embodiment).

The signal control circuit 23 generates a reference drive signal S2 which is a pulse signal at a predetermined frequency, on the basis of a reference signal S1 input from the oscillator circuit 21 and the frequency command value input from the control CPU 22, and outputs this signal to the signal generation circuit 25. Here, the control CPU 22 provides the signal control circuit 23 with the frequency command value for setting the frequency of the reference drive signal to the resonant frequency of the ultrasonic vibrator 4 or to its neighboring frequency. Therefore, the reference drive signal at about the same frequency as the resonant frequency of the ultrasonic vibrator 4 is output from the signal control circuit 23. A signal b indicated in FIG. 8 is one example of the reference drive signal S2. The period of the reference drive signal is the integral multiple of the period of the reference signal.

Furthermore, on the basis of the reference signal S1 input from the oscillator circuit 21 and the pulse width command value input from the control CPU 22, the signal control circuit 23 generates a dividing signal S3 having a higher frequency than the reference drive signal S2 and a pulse width corresponding to the velocity of the ultrasonic motor 2, and outputs this signal to the signal generation circuit 25. A signal c indicated in FIG. 8 is one example of the dividing signal S3. Here, the period of the dividing signal does not necessarily have to be constant. For example, the period of the dividing signal may change within the high-level term of the reference drive signal. Moreover, the period of the reference drive signal does not have to be the integral multiple of the period of the dividing signal.

More specifically, the signal control circuit 23 is composed of a frequency control circuit, a phase difference control circuit, a dividing signal control circuit and a pulse edge delay control circuit. That is, as the frequency control circuit, the signal control circuit 23 outputs the reference drive signal for determining the frequency of the drive signal with reference to the pulse number of the reference signal which is an output of the oscillator circuit 21, on the basis of the set value of the frequency in the parameter table 24. Further, as the phase difference control circuit, the signal control circuit 23 controls the phase difference between two drive signals or the A-phase signal and the B-phase signal with reference to the pulse number of the reference signal which is an output of the oscillator circuit 21, on the basis of the set value of the phase difference in the parameter table 24. Still further, as the dividing signal control circuit, the signal control circuit 23 outputs a signal for dividing, at a higher frequency, the high-level term of the reference drive signal generated in the frequency control circuit, with reference to the pulse number of the reference signal which is an output of the oscillator circuit 21, on the basis of the set value (period, pulse width) of the dividing signal in the parameter table 24. Moreover, as the pulse edge delay control circuit, the signal control circuit 23 delays the rising and falling of the drive signal with reference to the pulse number of the reference signal which is an output of the oscillator circuit 21, on the basis of the set value of the pulse edge delay in the parameter table 24.

The signal output control circuit 26 can directly control the on/off of the output of the signal generation circuit 25 and the output order of the A-phase signal and the B-phase signal, from the control CPU 22 via the signal output control circuit 26. The signal output control circuit 26 also controls the pulse number of the drive signal output from the signal generation circuit 25 and output downtime for intermittent drive, on the basis of a set value set in the parameter table 24.

The signal generation circuit 25 generates the A-phase reference drive signal and the B-phase reference drive signal having a phase difference of 90° on the basis of the reference drive signal S2 and the phase difference command value of the A-phase and the B-phase from the control CPU 22. Further, the signal generation circuit 25 outputs, as an alternating drive signal of the A-phase, the dividing signal input from the signal control circuit 23 in the high-level term of the reference drive signal of the A-phase, and outputs, as an alternating drive signal of the B-phase, the dividing signal input from the signal control circuit 23 in the high-level term of the reference drive signal of the B-phase.

Thus, there are generated the A-phase alternating drive signal in which the high-level term of the reference drive signal of the A-phase is composed of the dividing signals, and the B-phase alternating drive signal in which the high-level term of the reference drive signal of the B-phase is composed of the dividing signals. That is, the signal generation circuit 25 generates the A-phase reference drive signal and the B-phase reference drive signal having a phase difference of 90° on the basis of the reference drive signal S2 and the phase difference command value of the A-phase and the B-phase from the control CPU 22. In addition, the on/off of the output is controlled by the signal output control circuit 26.

At this point, the alternating drive signals of the A-phase and the B-phase are separately generated on a positive side and a negative side. A signal d indicated in FIG. 8 is one example of the alternating drive signal on the A-phase positive side. A signal e indicated in FIG. 8 is one example of the alternating drive signal on the B-phase positive side. A signal f indicated in FIG. 8 is one example of the alternating drive signal on the A-phase negative side. A signal g indicated in FIG. 8 is one example of the alternating drive signal on the B-phase negative side.

As shown in FIG. 8, the phase difference between the A-phase alternating drive signal and the B-phase alternating drive signal is 90° in the present first embodiment. Moreover, the positive alternating drive signal and the negative alternating drive signal are opposite in polarity and out of phase by 180°.

After having generated the A-phase positive alternating drive signal, the B-phase positive alternating drive signal, the A-phase negative alternating drive signal and the B-phase negative alternating drive signal, the signal generation circuit 25 outputs these alternating drive signals to the drive circuit 30.

Figures 9, 10:
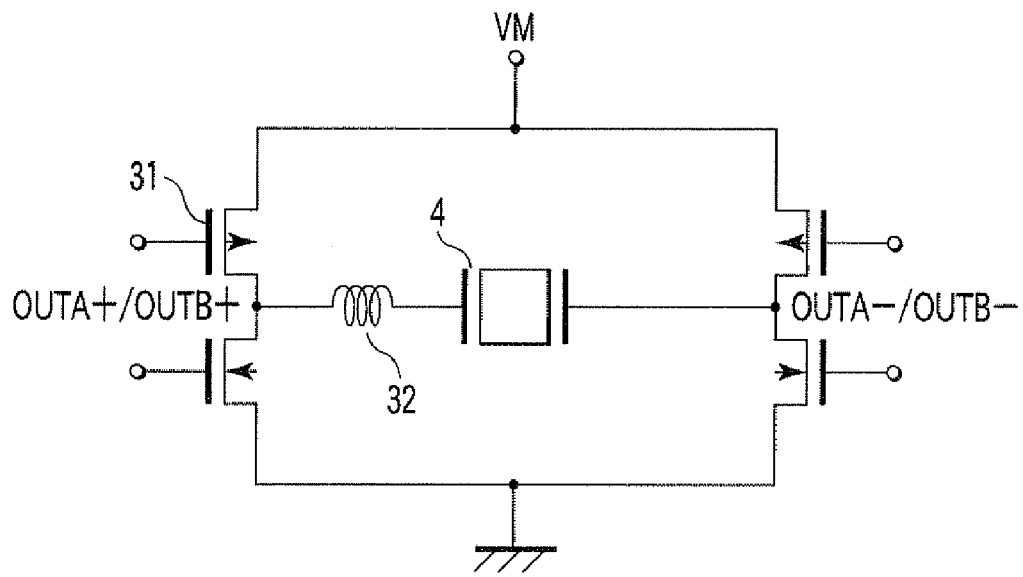
FIG. 9 is a diagram showing one configuration example of a drive circuit.
FIG. 10 is a diagram showing a truth table of input/output values in the case where alternating drive signals are input to the drive circuit from a signal generation circuit.

As shown in FIG. 9, the drive circuit 30 comprises an H-bridge circuit 31 configured by a switching element, and a coil 32 for impedance matching and pressure boosting. If the various alternating drive signals are input to the drive circuit 30 from the signal generation circuit 25, alternating drive voltages OUTA+, OUTA−, OUTB+, OUTB− are output in accordance with a truth table shown in FIG. 10.

At this point, the alternating drive signals which are pulse signals are converted into a waveform close to a sinusoidal wave due to the action of the coil 32 provided in the drive circuit 30, and the alternating drive signals of the A-phase and the B-phase close to the sinusoidal wave are applied to the external electrodes 11 of the A-phase (A+, A−) and the B-phase (B+, B−) provided in the ultrasonic vibrator 4.

Figure 11:
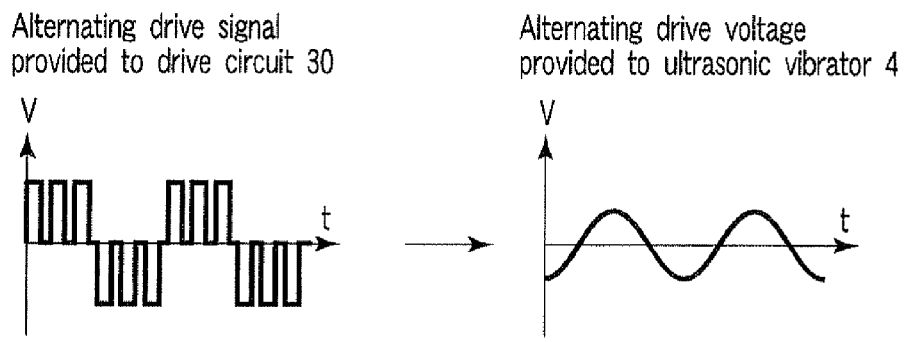
FIG. 11 is a diagram showing graphs of the alternating drive signal provided to the drive circuit and an alternating drive voltage provided to the ultrasonic vibrator.

FIG. 11 shows by way of example an alternating drive signal of the A-phase (A+, A−) supplied from the signal generation circuit 25 to the drive circuit 30, and the alternating drive voltage OUT (A+, A−) supplied from the drive circuit 30 to the A-phase (A+, A−) of the ultrasonic vibrator 4.

Here, the longitudinal vibration excited in the ultrasonic vibrator 4 is detected by the internal electrodes 8 of the C-phase (C+, C−), and an electrical signal proportionate to the longitudinal vibration detected by the internal electrodes 8 is input to the phase difference detection circuit 28 via the external electrodes 11 of the C-phase (C+, C−).

Furthermore, one of the alternating drive signals, for example, the A-phase positive alternating drive signal is input to the phase difference detection circuit 28 from the signal generation circuit 25. The phase difference detection circuit 28 detects the phase difference between the vibration detection signal input via the external electrodes 11 of the ultrasonic vibrator 4 and the alternating drive signal input from the signal generation circuit 25, and outputs an electrical signal proportionate to the phase difference to the control CPU 22. Thus, a feedback loop regarding the phase of the ultrasonic vibrator 4 is formed, and feedback control to attain a constant phase difference (e.g., 90°) of the ultrasonic vibrator 4 is performed by the control CPU 22.

Next, a method of driving the ultrasonic motor 2 by the drive apparatus 3 having the above-mentioned configuration is described. First, at the start of the ultrasonic motor 2, the reference signal is input from the oscillator circuit 21 to the signal control circuit 23. On the other hand, the control CPU 22 reads a drive frequency of the ultrasonic motor 2 set in the parameter table, and provides its resonant frequency to the signal control circuit 23 as the frequency command value.

Furthermore, the control CPU 22 reads the frequency and pulse width of the dividing signal set as initial values from the parameter table 24, and provides these to the signal control circuit 23. Moreover, the control CPU 22 reads, from the parameter table 24, the phase difference between the A-phase and the B-phase set as an initial value, and provides this phase difference to the signal generation circuit 25. Thus, the reference drive signal S2 set to the resonant frequency of the ultrasonic vibrator 4 or to its neighboring frequency is generated by the signal control circuit 23, and output to the signal generation circuit 25. Moreover, the dividing signal S3 which is a pulse signal having the frequency and pulse width provided by the control CPU 22 is generated by the signal control circuit 23, and output to the signal generation circuit 25.

On the basis of the reference drive signal S2 and the phase difference output from the control CPU 22, the signal generation circuit 25 generates a reference drive signal corresponding to the A-phase (A+, A−) and a reference drive signal corresponding to the B-phase (B+, B−) which are reference drive signals having a predetermined phase difference. Further, the signal generation circuit 25 outputs the dividing signal S3 as an alternating drive signal in the high-level term of each phase. As a result, as indicated by a signal e to signal g shown in FIG. 8, the alternating drive signals in which the high-level terms of the reference drive signals corresponding to A-phase and the B-phase are composed of the dividing signals are generated.

The alternating drive signals of A-phase and the B-phase are converted by the drive circuit 30 into alternating drive signals having a sinusoidal wave, and then applied to the external electrodes 11 of the ultrasonic vibrator 4. Thus, the longitudinal vibration and the bending vibration as shown in FIGS. 5 and 6 are simultaneously excited in the ultrasonic vibrator. As a result, the frictional contacts 10 generate elliptical vibration, such that the driven member 5 is relatively moved.

The longitudinal vibration excited in the ultrasonic vibrator 4 is detected by the internal electrodes 8 and external electrodes 11 of the C-phase, and the vibration detection signal is input to the phase difference detection circuit 28. The phase difference between the longitudinal vibration excited in the ultrasonic vibrator 4 and the A-phase alternating drive signal output from the signal generation circuit 25 is detected by the phase difference detection circuit 28, and an electrical signal corresponding to this phase difference is output to the control CPU 22.

The control CPU 22 compares the phase difference detected by the phase difference detection circuit 28 (hereinafter referred to as a "detected phase difference") with a target phase difference, and generates a frequency command value by which the detected phase difference coincides with the target phase difference, and then provides the signal control circuit 23 with this frequency command value.

Figure 12:
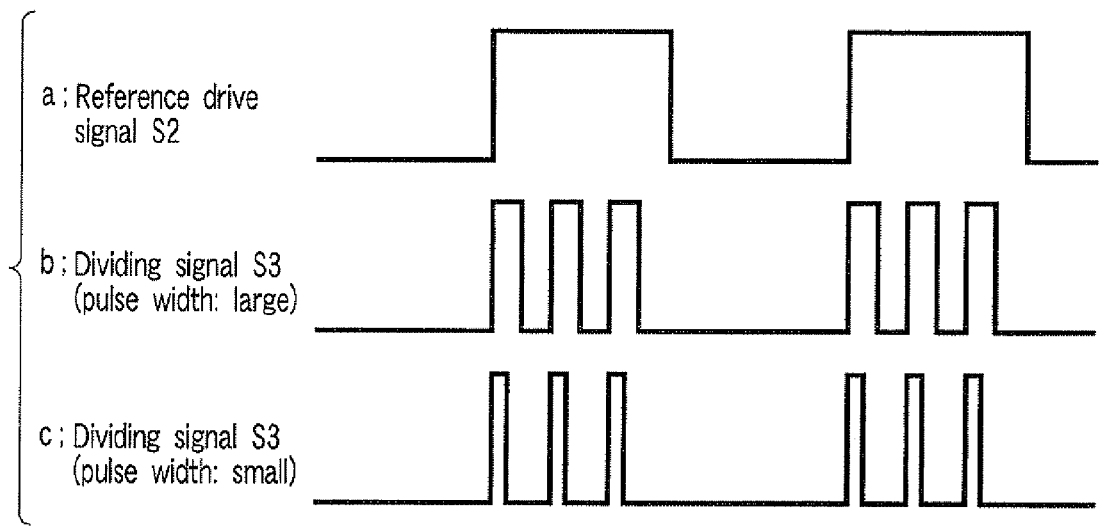
FIG. 12 is a diagram showing graphs of the generation and output of a dividing signal having a pulse width adjusted in accordance with the velocity of an ultrasonic motor.

Furthermore, the control CPU 22 finds the amount of movement of the driven member 5 from a count value input from the encoder signal processing circuit 35, and divides this movement amount by a sampling period to calculate a driving velocity of the ultrasonic motor 2. Then, when this driving velocity is higher than a target velocity, the control CPU 22 creates a pulse width command value which decreases the pulse width of the dividing signal. On the other hand, when the driving velocity is lower than the target velocity, the control CPU 22 creates a pulse width command value which increases the pulse width of the dividing signal, and provides the signal control circuit 23 with this pulse width command value. Thus, as shown in FIG. 12, the dividing signal whose pulse width has been adjusted in accordance with the velocity of the ultrasonic motor 2 is generated and output by the control CPU 22.

Thus, the motor is stably driven with the feedback control performed over the driving velocity and the phase difference, and when the count value reported from the encoder signal processing circuit 35 has reached a preset count value, the control CPU 22 judges that the driven member 5 has moved to a desired position, and outputs a drive stop command to the signal generation circuit 25. Consequently, no alternating drive signal is output from the signal generation circuit 25 any longer, so that the vibration of the ultrasonic vibrator 4 gradually converges, and the ultrasonic motor 2 stops.

The velocity control by the drive apparatus for the ultrasonic motor according to the present first embodiment is described below in detail.

First, the driving velocity of the ultrasonic motor 2 is detected in the following manner: The control CPU 22 reads a count value of the encoder 33 (hereinafter referred to as an encoder count value) from the parameter table 24 at each arbitrary period, and finds a driving position from the encoder count value. Then, the control CPU 22 calculates a driving velocity of the ultrasonic motor 2 on the basis of the sampling period and the amount of change of the driving position between the sampling periods.

Here, when controlling the ultrasonic motor 2 at a constant velocity, the control CPU 22 compares the reference velocity to be controlled with the detected driving velocity to perform the following control: When the detected driving velocity is higher than the reference velocity, the control CPU 22 provides the parameter table 24 with a set value of the pulse width of the dividing signal so that the pulse width of the dividing signal may be decreased by the signal control circuit 23. On the other hand, when the detected driving velocity is lower than the reference velocity, the control CPU 22 provides the parameter table 24 with a set value of the pulse width of the dividing signal so that the pulse width of the dividing signal may be increased by the signal control circuit 23.

In addition to the pulse width of the dividing signal set by the signal control circuit 23, parameters for controlling the driving velocity include the frequency of the drive signal set by the signal control circuit 23, the phase difference between the A-phase drive signal and the B-phase drive signal set by the signal control circuit 23, and the pulse width of the drive signal set by the signal control circuit 23. The use of these parameters also makes it possible to obtain effects equal to those in the case of control using the pulse width of the dividing signal.

The positional control by the drive apparatus for the ultrasonic motor according to the present first embodiment is described below in detail.

First, the control CPU 22 detects the driving position of the ultrasonic motor 2 in the following manner: The control CPU 22 reads the encoder count value from the parameter table 24, and finds the current driving position of the ultrasonic motor 2 from the relational expression of the encoder count value and the driving position.

In order to stop the ultrasonic motor 2 at a predetermined position, the following two methods are mainly available:

(Method 1) The control CPU 22 reads the encoder count value from the parameter table 24 at an arbitrary period. When judging that this count value has exceeded a predetermined count value or a predetermined position calculated from the predetermined count value, the control CPU 22 outputs a stop signal to the signal output control circuit 26 to stop the output of the drive signal, and stops the driving of the ultrasonic motor 2.

(Method 2) A function is provided so that a signal to stop the driving of the ultrasonic motor 2 is automatically output from the signal output control circuit 26 to the signal generation circuit 25 when the encoder count value has exceeded a predetermined count value set in the parameter table 24. Thus, the driving of the ultrasonic motor 2 is stopped by this function.

The stop control by the drive apparatus for the ultrasonic motor according to the present first embodiment is described below in detail.

Figure 13:
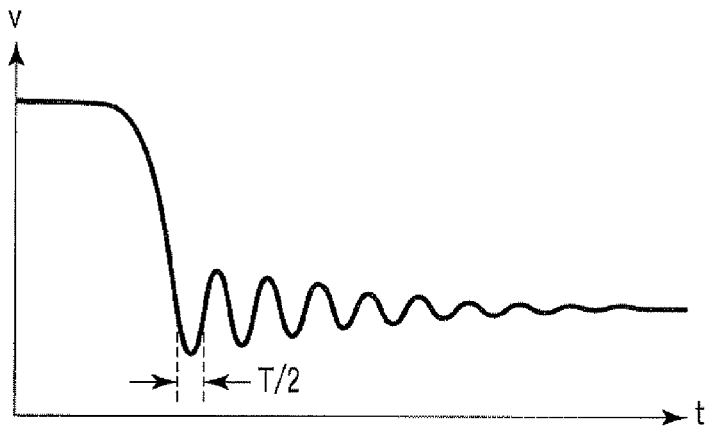
FIG. 13 is a diagram showing a change in the driving velocity of the ultrasonic motor in the case where the output of a signal control circuit is simply stopped to stop the ultrasonic motor.

FIG. 13 is a diagram showing a change in the driving velocity of the ultrasonic motor 2 in the case where the output of the signal control circuit 23 is simply stopped to stop the ultrasonic motor 2.

The vibration system of the ultrasonic motor 2 has a natural frequency. Therefore, when the ultrasonic motor 2 is stopped, residual vibration corresponding to the natural frequency of the vibration system of the ultrasonic motor 2 is generated as shown in FIG. 13 if the application of the above-mentioned driving signal is simply stopped to stop the ultrasonic motor 2. As a result, the time required to stop the ultrasonic motor 2 increases as much as the duration of the residual vibration. Accordingly, the accuracy of the stop position deteriorates.

Thus, in stopping the driving of the ultrasonic motor 2, the drive apparatus for the ultrasonic motor according to the present first embodiment once stops the output of the signal control circuit 23, and then applies a burst signal to the ultrasonic vibrator 4 with predetermined timing to perform burst drive. Here, the burst signal is a signal composed of a group of pulse signals, for example, as shown in FIG. 14B.

Figure 14A:
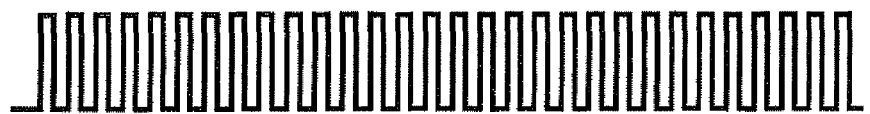
FIG. 14A is a diagram showing a pulse signal for continuous drive.
Figure 14B:
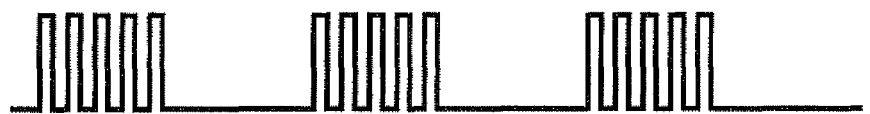
FIG. 14B is a diagram showing a burst signal for burst drive.

That is, in normal continuous drive, the pulse signals are continuously applied to the ultrasonic vibrator 4 as shown in FIG. 14A. However, in the burst drive, the burst signal composed of a bunch of pulse signals is applied to the ultrasonic vibrator 4 as shown in FIG. 14B.

Figure 15:
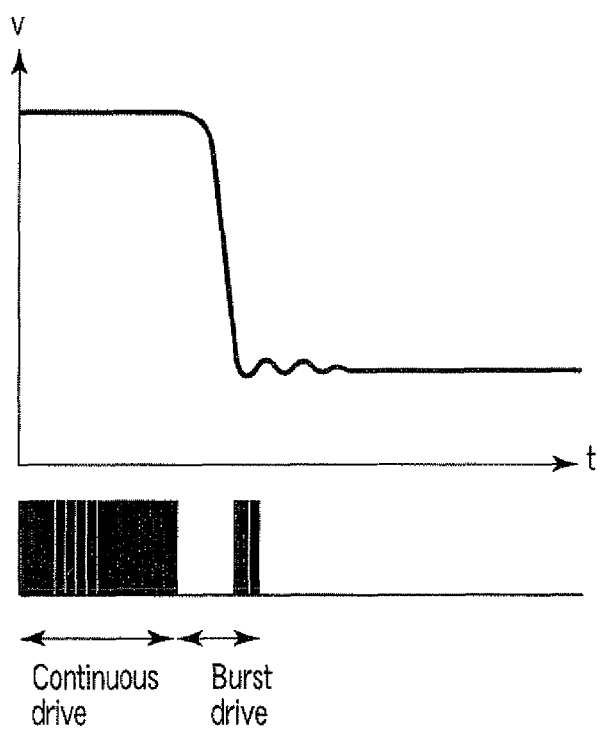
FIG. 15 is a diagram showing a change in the driving velocity of the ultrasonic motor in the case where a switch is made to the burst drive when the ultrasonic motor is stopped so that residual vibration is inhibited.

A graph in FIG. 15 shows a change in the driving velocity of the ultrasonic motor 2 in the case where the output of the signal control circuit 23 is once stopped before the burst drive is performed by a single burst signal with predetermined timing, in stopping the ultrasonic motor 2.

On the other hand, FIG. 16 is a diagram showing a change in the driving velocity of the ultrasonic motor 2 in the case where the burst drive by the burst signal as shown in FIG. 15 is not carried out in stopping the ultrasonic motor 2.

As apparent from the comparison between FIGS. 15 and 16, in stopping the ultrasonic motor 2, the output of the signal control circuit 23 is once stopped, and the burst drive is performed by the single burst signal with the predetermined timing, such that it is possible to inhibit the generation of the residual vibration corresponding to the natural frequency of the vibration system of the ultrasonic motor 2.

That is, in stopping the ultrasonic motor 2, the drive signal is switched from the continuous drive to the burst drive when the ultrasonic motor has reached a set predetermined position, such that the above-mentioned residual vibration is inhibited, and the variation of the velocity is reduced as shown in FIG. 15 to rapidly stop the ultrasonic motor.

Here, in order to effectively inhibit the residual vibration, it is preferable to apply the burst signal to the ultrasonic vibrator 4 to perform the burst drive in a T/2 term shown in FIG. 13 (a term corresponding to half the period of initial vibration to move in a direction opposite to the direction in which the ultrasonic motor 2 has been moving so far), wherein T is the period the of the initial vibration of the residual vibration.

In addition, when the burst drive is performed as described above, more detailed drive control adapted to the state of the residual vibration may be performed. For example, in the case of vibration having relatively strong residual vibration, the burst drive should be performed at a frequency closer to the resonant frequency of the ultrasonic vibrator 4. On the other hand, in the case of vibration having relatively weak residual vibration, the burst drive may be performed at a frequency separate from the resonant frequency of the ultrasonic vibrator 4.

Thus, the frequency of the burst signal for the burst drive is changed suitably to the state of the residual vibration to perform the burst drive, such that the residual vibration can be more effectively inhibited.

As described above, according to the present first embodiment, it is possible to provide a drive apparatus for an ultrasonic motor which achieves higher stop position accuracy and satisfactory response in controlling the stopping of the ultrasonic vibrator which also achieves circuit simplification.

Specifically, in the drive apparatus for the ultrasonic motor according to the present first embodiment, a switch is made from the continuous drive to the burst drive in stopping the ultrasonic motor, such that the vibration of the whole vibration system of the ultrasonic motor is counteracted.

This makes it possible to efficiently decelerate and stop the ultrasonic motor, and improve the stop position accuracy. Moreover, there is no need for means for detecting the vibration of the ultrasonic vibrator 4 and means for delaying the phase of the drive signal on the basis of the detection result by the vibration detecting means, so that the drive circuit can be simplified.

Furthermore, in performing the burst drive, the frequency of the burst signal for the burst drive is changed suitably to the state of the residual vibration as described above, such that the vibration of the whole vibration system of the ultrasonic motor can be efficiently counteracted.

SECOND EMBODIMENT

A drive apparatus for an ultrasonic motor according to a second embodiment of the present invention is described below. It is to be noted that the difference between this drive apparatus for the ultrasonic motor and the drive apparatus for the ultrasonic motor according to the first embodiment described above is only explained.

In the above first embodiment, as described with reference to FIGS. 15 and 16, in stopping the driving of the ultrasonic motor 2, the output of the signal control circuit 23 is once stopped, and then the burst drive is performed by applying the single burst signal to the ultrasonic vibrator 4 with the predetermined timing. Thus, the generation of the residual vibration corresponding to the natural frequency of the vibration system of the ultrasonic motor 2 is inhibited.

On the other hand, in the present second embodiment, as shown in FIG. 17, in stopping the driving of the ultrasonic motor 2, the output of the signal control circuit 23 is once stopped, and then the burst drive is performed by applying a plurality of burst signals to the ultrasonic vibrator 4 for a predetermined term. Thus, the generation of the residual vibration corresponding to the natural frequency of the vibration system of the ultrasonic motor 2 is inhibited.

Here, the period of the application of the plurality of burst signals is shorter than at least a period T of the residual vibration. Moreover, it is preferable that at least one of the plurality of burst drives is performed in a term corresponding to half the period of initial vibration to move in a direction opposite to the direction in which the ultrasonic motor 2 has been moving so far (the T/2 term shown in FIG. 13).

As described above, according to the present second embodiment, it is possible to provide a drive apparatus for an ultrasonic motor providing effects similar to those of the drive apparatus for the ultrasonic motor according to the first embodiment. That is, the burst drive is performed when the driving of the ultrasonic motor 2 is stopped, such that the vibration of the whole vibration system of the ultrasonic motor 2 is counteracted to inhibit the residual vibration, and the ultrasonic motor 2 can be efficiently decelerated and stopped, and moreover, the stop position accuracy can be improved.

While the present invention has been described above in connection with the first embodiment and the second embodiment, it should be understood that the present invention is not limited to the embodiments described above and various modifications and applications can be made within the spirit of the present invention.

Furthermore, the embodiments described above include inventions at various stages, and suitable combinations of a plurality of disclosed constitutional requirements permit various inventions to be extracted. For example, when the problems described in the section BACKGROUND OF THE INVENTION can be solved and the advantages described in the section BRIEF SUMMARY OF THE INVENTION can be obtained even if some of all the constitutional requirements shown in the embodiments are eliminated, a configuration in which those constitutional requirements are eliminated can be extracted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drive apparatus for an ultrasonic motor in which a diphase alternating drive signal having a predetermined phase difference and a predetermined drive frequency is applied to a vibrator equipped with a driver to be in contact with a driven member, such that longitudinal vibration and bending vibration are simultaneously generated in the vibrator to generate elliptical vibration, and drive force is obtained from the elliptical vibration to drive the driven member by the driver, the drive apparatus for the ultrasonic motor comprising:

drive unit for generating the alternating drive signal and applying the alternating drive signal to the vibrator to drive the driven member; and burst drive unit for performing burst drive by applying, to the vibrator, a burst signal to inhibit residual vibration in the driven member after the driving of the driven member by the drive unit has been stopped.

2. The drive apparatus for the ultrasonic motor according to claim 1, wherein the burst drive unit performs the burst drive by applying a single burst signal to the vibrator after a predetermined time has passed since the stopping of the driving of the driven member by the drive unit.

3. The drive apparatus for the ultrasonic motor according to claim 1, wherein the burst drive unit performs the burst drive by applying a plurality of burst signals to the vibrator for a predetermined term after the driving of the driven member by the drive unit has been stopped.

4. The drive apparatus for the ultrasonic motor according to claim 2, wherein the burst drive unit performs the burst drive in at least a term corresponding to half the period of initial vibration in the residual vibration.

5. The drive apparatus for the ultrasonic motor according to claim 3, wherein the burst drive unit performs the burst drive in at least a term corresponding to half the period of initial vibration in the residual vibration.

6. The drive apparatus for the ultrasonic motor according to claim 4, wherein the frequency of the burst signal applied to the vibrator by the burst drive unit is different from the frequency of the alternating drive signal by the drive unit.

* * * * *